(12) United States Patent
Sanford et al.

(10) Patent No.: US 10,410,468 B1
(45) Date of Patent: Sep. 10, 2019

(54) SYSTEMS AND METHODS FOR AUTOMATED MOBILE CASH ADVANCE TRANSACTIONS

(71) Applicant: Sightline Interactive LLC, Las Vegas, NV (US)

(72) Inventors: Kirk E. Sanford, Las Vegas, NV (US); Thomas M. Sears, Henderson, NV (US); Omer Sattar, Las Vegas, NV (US)

(73) Assignee: Sightline Interactive LLC, Las Vegas, NV (US)

( * ) Notice: Subject to any disclaimer, the term of this patent is extended or adjusted under 35 U.S.C. 154(b) by 0 days.

(21) Appl. No.: 16/157,203

(22) Filed: Oct. 11, 2018

(51) Int. Cl.
*G07F 17/32* (2006.01)
*G06Q 20/40* (2012.01)
*G06Q 50/34* (2012.01)

(52) U.S. Cl.
CPC ......... *G07F 17/3244* (2013.01); *G06Q 20/40* (2013.01); *G06Q 50/34* (2013.01); *G07F 17/3239* (2013.01); *G07F 17/3255* (2013.01)

(58) Field of Classification Search
CPC ............. G07F 17/3244; G07F 17/3239; G07F 17/3255; G06Q 20/40; G06Q 50/34
USPC ........................................................... 463/25
See application file for complete search history.

(56) References Cited

U.S. PATENT DOCUMENTS

| 8,025,216 | B2 * | 9/2011 | Potts | G06Q 20/04 235/379 |
| 8,992,305 | B2 * | 3/2015 | Sanford | G06Q 30/02 463/25 |
| 2013/0090155 | A1 * | 4/2013 | Johnson | G06Q 20/18 463/25 |
| 2015/0339654 | A1 * | 11/2015 | Warner | G07F 17/3251 463/25 |

* cited by examiner

*Primary Examiner* — Allen Chan
(74) *Attorney, Agent, or Firm* — Ulmer & Berne LLP

(57) ABSTRACT

Systems and methods are provided for providing patrons of gaming environments with cash advances. The cash advance can be initiated by the patron via a mobile communication device and finalized at any of a variety of fund retrieval devices, such as a self-service kiosk, an electronic table game, a gaming machine, or a casino cage. The patron's funds can be dispensed to the patron in any of a variety of formats, such as cash, a printed voucher, chips, or gameplay credits.

26 Claims, 7 Drawing Sheets

SYSTEMS AND METHODS FOR AUTOMATED MOBILE CASH ADVANCE TRANSACTIONS

BACKGROUND

Casino gaming is a highly popular activity in today's society. A particular individual's enjoyment of the casino gaming experience is often predicated on having an adequate supply of cash or other cash equivalents that allow the patron to participate in gaming activities such as slot machine and table game play. In the most basic form, the casino patron brings a specific amount of cash to the casino that can be exchanged for negotiable playing chips, casino issued gaming cards, or used with various gaming devices such as slot machines. Invariably, a casino patron may choose not to bring the desired amount of cash to the casino or the patron may deplete the supply of cash or cash equivalents brought to the casino before the casino patron is ready to end the gaming experience. Under these circumstances the patron will desire to obtain additional cash or cash equivalents through use of one or more financial instruments such as a debit card or credit card, where the casino patron maintains accounts with applicable financial institutions. For example, within the casino premises patrons generally have the ability to get a "cash advance" against their available credit card limit available on a payment vehicle. Such a process can require the patron to initiate the cash advance process at a first step. This first step can be initiated at a self-service kiosk on the gaming floor. Once the cash advance process is initiated, the patron then must find the casino cage and invariably wait in line to complete the transaction. After speaking with an attendant, who will confirm the transaction and confirm the identity of the patron, the patron will eventually be provided with cash. This process, therefore, requires intervention by casino staff and requires the casino to operate kiosks that include such functionality. Moreover, this multi-step process to access funds can be considered inconvenient, time consuming, and even frustrating by many patrons. Thus, while approaches are available for patrons to receive a cash advance, there are opportunities for improvement. Indeed, it would be advantageous to allow patrons to obtain additional cash or cash equivalents in a convenient and efficient process. The field can also benefit from systems and methods allowing for new and expanded options for a player to obtain additional cash or cash equivalents.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
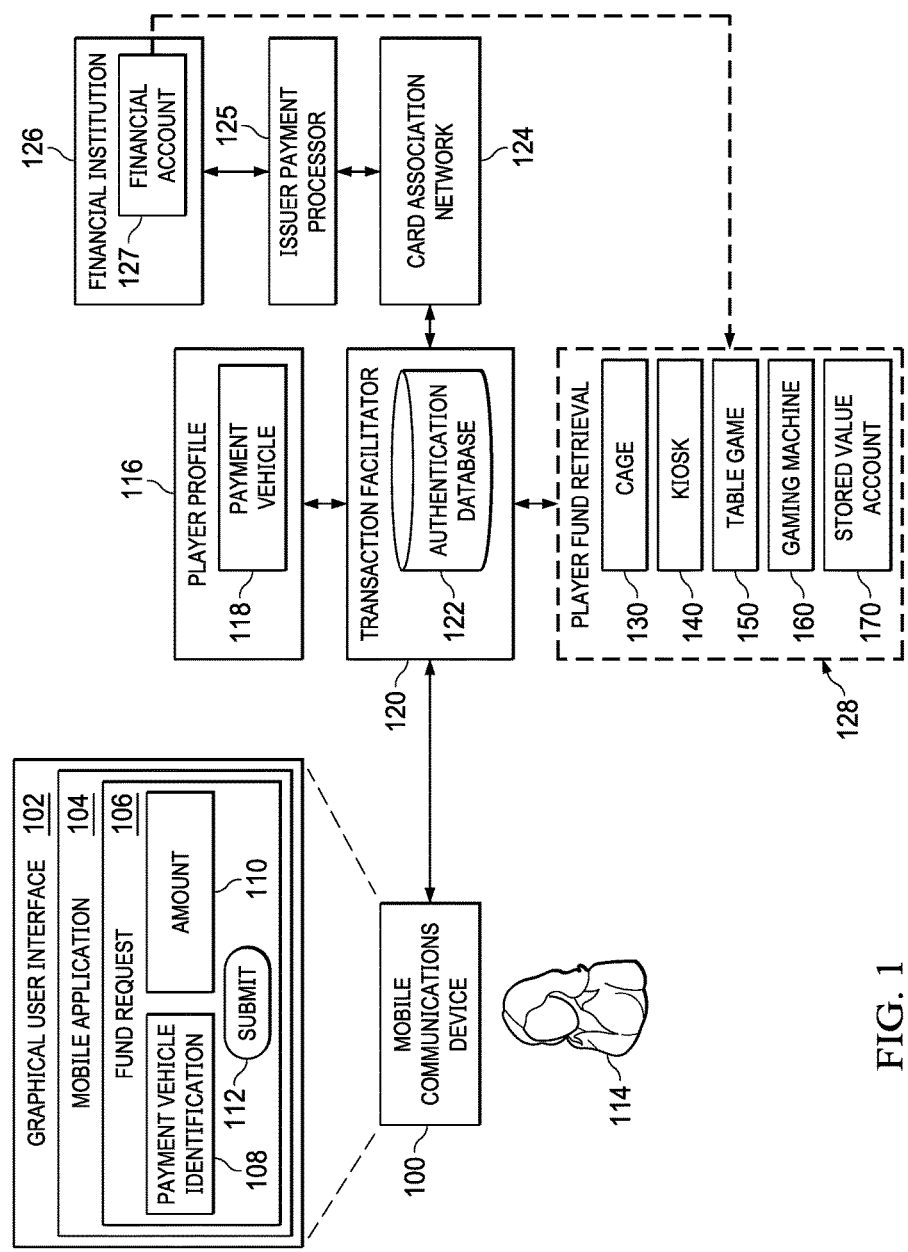
FIG. 1 schematically illustrates a player retrieving funds from a financial account via a fund request provided via a mobile communications device in accordance with one non-limiting embodiment.

Various non-limiting embodiments of the present disclosure will now be described to provide an overall understanding of the principles of the structure, function, and use of the funds access systems and methods disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term software is used expansively to include not only executable code, but also data structures, data stores, and computing instructions in any electronic format, firmware, and embedded software. The terms information and data are used expansively and can include a wide variety of electronic information, including but not limited to machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the systems and methods described herein. None of the features or components shown in the drawings or discussed below should be taken as mandatory for any specific implementation of any of these systems and methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Referring first to FIG. 1, a schematic illustration of a player 114 retrieving funds from a financial account 127 via a fund request provided via a mobile communications device 100 is shown. The mobile communications device 100 can be any suitable networked device, such as a smart phone, a tablet computer, or a handheld computing device, for example. To initiate the fund request, the player 114 can interact with a mobile application 104 executing on the mobile communications device 100. The mobile application 104 can be, for instance, a web browser or can be a specialized application hosted, provided by, or otherwise associated with a gaming environment, financial institution, or other entity. The mobile application 104 can present screens to the player 114 via a graphical user interface 102, as schematically shown in FIG. 1. The player 114 can provide information, via the graphical user interface 102, to initiate a fund request (sometimes referred to as a "cash advance") in order to access funds tied to a payment vehicle associated with the player 114. Payment vehicles in accordance with the present disclosure can be any suitable payment vehicle, such as a physical card, a virtual payment device, or have any other suitable format. In some embodiments the payment vehicle is a credit payment vehicle (i.e., a credit card). In some embodiments the payment vehicle is a debit payment vehicle (i.e., a debit card). The credit or debit payment vehicle can also be embodied as a mobile payment device, such as a mobile wallet or other type of mobile payment technology. The payment vehicle can be an open-loop payment vehicle. The payment vehicle can be associated with a card association network (MASTERCARD, VISA, DISCOVER, and so forth) and can generally be used at any merchant or ATM accepting payment cards associated with the card association network.

To initiate a cash advance process via the mobile communications device 100, the player 114 can enter information into a fund request screen 106. A simplified version of an example fund request screen 106 is schematically shown in FIG. 1. The fund request screen 106 can have, for example, a payment vehicle identification field 108 that identifies the payment vehicle from which funds are to be retrieved. In some embodiments, the player 114 can select the payment vehicle from a digital wallet, manually type in identifying information, optically scan a payment vehicle, enter relevant information by obtaining information from the payment vehicle via near field communication technology, or otherwise provide or enter the payment vehicle information using any other suitable technique. The fund request screen 106 can also include an amount field 110, in which the player 114 supplies the amount of funds desired to be retrieved during the cash advance transaction. As is to be appreciated, the fund request screen 106 can include a variety of other fields, such as a PIN number field, and a password field, among others. Further, in accordance with some embodiments, geolocation techniques can be utilized to determine the physical location of the mobile communications device 100 at the time the fund request is transmitted for gaming regulation compliance or other purposes.

In accordance with various embodiments, information that is provided by the player 114 through the mobile communications device 100 can be provided to a transaction facilitator 120 via network communications. The transaction facilitator 120 can generally direct or enable cash advance transactions in accordance with the present disclosure. In some embodiments, the transaction facilitator 120 can maintain a player profile 116 for players that are linked to payment vehicle 118 of the player. As such, when the player 114 is interacting with the mobile application 104, the payment vehicle 118 can be presented to the player 114 as an option for cash advance. The payment vehicle 118 can be issued by a financial institution 126 and associated with a financial account 127 through conventional techniques.

Upon receiving the fund request from the mobile communications device 100 requesting a cash advance from payment vehicle 118, the transaction facilitator 120 can electronically submit an authorization request through a card association network 124 of the payment vehicle 118. For instance, the card association network 124 may be the VISA network, the MASTERCARD network, or the DISCOVER network. The authorization request can ultimately be received by an issuer payment processor 125 of the financial institution 126. The response to the authorization request can be returned to the transaction facilitator 120 through the card association network 124. The transaction facilitator 120 can store the response in an authorization response database 122.

It is noted that while the transaction facilitator 120 is schematically illustrated as a single computing system for ease of illustration, it is to be appreciated that this disclosure is not so limited. Instead, the functionality of the transaction facilitator 120, as described herein, can be distributed across, or otherwise performed by, a plurality of various entities, such as payment gateways, acquirer processors, and other types of payment intermediaries. Also, the transaction facilitator 120, or at least components thereof, can reside within a gaming environment or be controlled by an operator of the gaming environment. The transaction facilitator 120 can also have a one-to-one processing relationship with a gaming environment or the transaction facilitator 120 can have a one-to-many configuration such that it has a processing relationship with a plurality of different gaming environments.

Still referring to FIG. 1, when the authorization request is approved, the player 114 can complete the cash advance transaction and retrieve funds from the financial account 127 using any of a variety of player fund retrieval techniques 128 in accordance with the present disclosure. As schematically shown in FIG. 1, and described in more detail below, example devices or places from which funds can be retrieved can include, without limitation, at a casino cage 130, at a self-service kiosk 140, at an electronic table game 150, at a gaming machine 160, or via a transfer of funds into a stored value account 170 associated with the player 114. In some embodiments, the stored value account 170 can be tied to a cashless gaming wallet of the player 114. When the player 114 seeks to retrieve their funds through any suitable technique, the transaction facilitator 120 can identify the player 114 and then query the authorization response database 122 to determine if a cash advance was authorized. If authorization approval was received from the financial institution 126, funds can be provided to the player 114. As provided below, the format of the funds provided to the player 114 may vary. By way of non-limiting examples, cash may be provided to the player 114, a voucher may be provided to the player 114, chips may be provided to the player 114, or gaming credits may be provided to the player 114.

Figure 2:
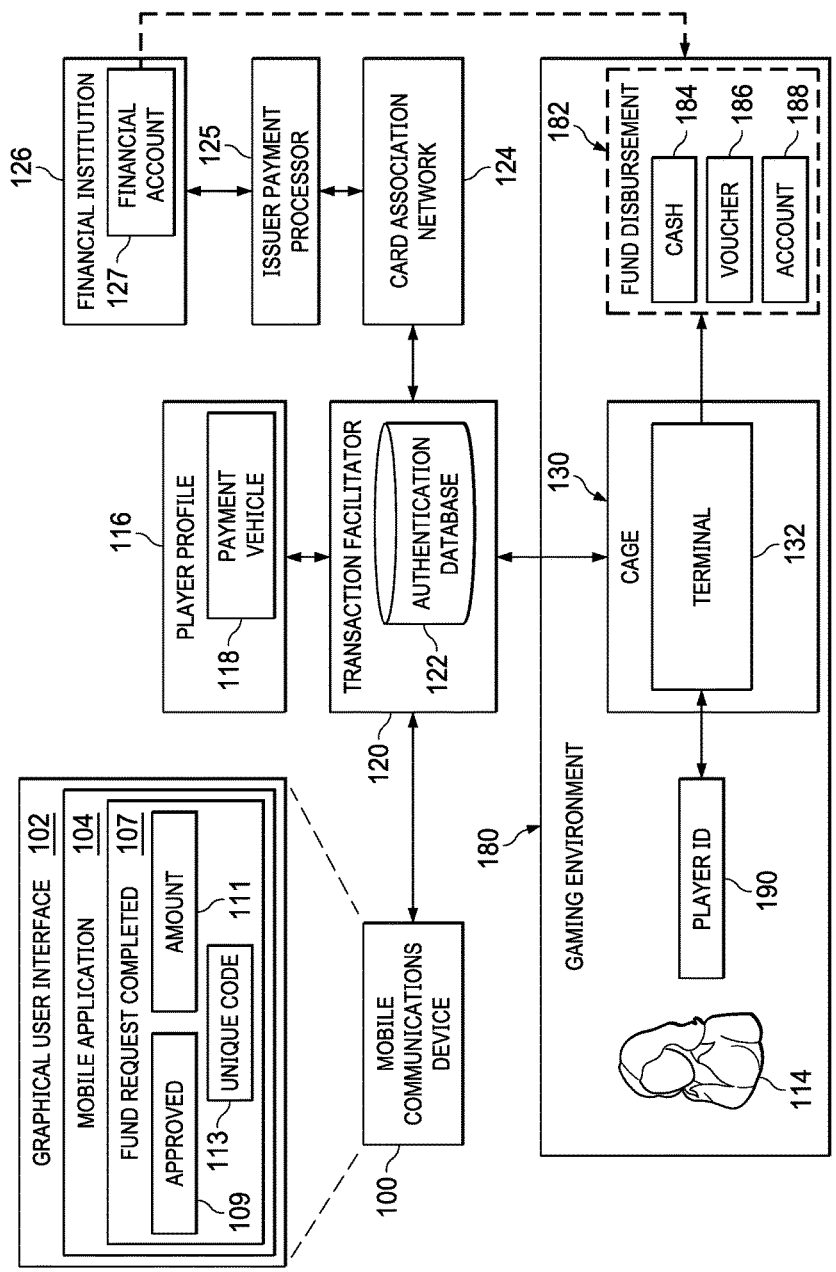
FIG. 2 schematically illustrates a player retrieving disbursed funds from a casino cage within a gaming environment in accordance with one non-limiting embodiment.

FIG. 2 schematically illustrates the player 114 from FIG. 1 retrieving disbursed funds from a casino cage 130 within a gaming environment 180 in accordance with one non-limiting embodiment. In some embodiments, subsequent to the authorization request being approved, the mobile application 104 can display an indication of approval 109 and an amount of approved cash advance 111. The player 114 can approach the cage 130 and interact with a cage attendant to complete the transaction. During the transaction, the player 114 can provide a player identifier 190. The format of the player identifier 190 can vary, but in some embodiments the player identifier 190 can be a driver's license or other state or federal issued document. Additionally or alternatively, the mobile communications device 100 can provide a unique code 113 that can be provided to a terminal 132 within the casino cage 130. The unique code 113 can be, without limitation, an optical code (i.e., QR code, bar code), an audio code, an alphanumeric code, a code transmittable via a near field communication protocol, and so forth. In various embodiments, the cage attendant may require multiple player identifiers 190, such as a driver's license of the player 114 and the unique code 113 provided by the mobile communications device 100 before completing the cash advance transaction.

Once the player identifier 190 is received by the terminal 132, the terminal 132 can query the transaction facilitator 120 to determine whether to disburse funds to the player 114. In other embodiments, the terminal 132 has access to the authorization approval without having to communicate with the transaction facilitator 120 during the transaction. As indicated in FIG. 2, a funds disbursement process 182 can occur in a variety of different ways. For example, the cage attendant may provide the player 114 with cash 184 or a printed voucher 186 (such as a "TITO" ticket). Additionally or alternatively, the funds acquired from the cash advance may be loaded into an account 188 of the player 114, with funds in the account 188 usable for gameplay.

Figure 3:
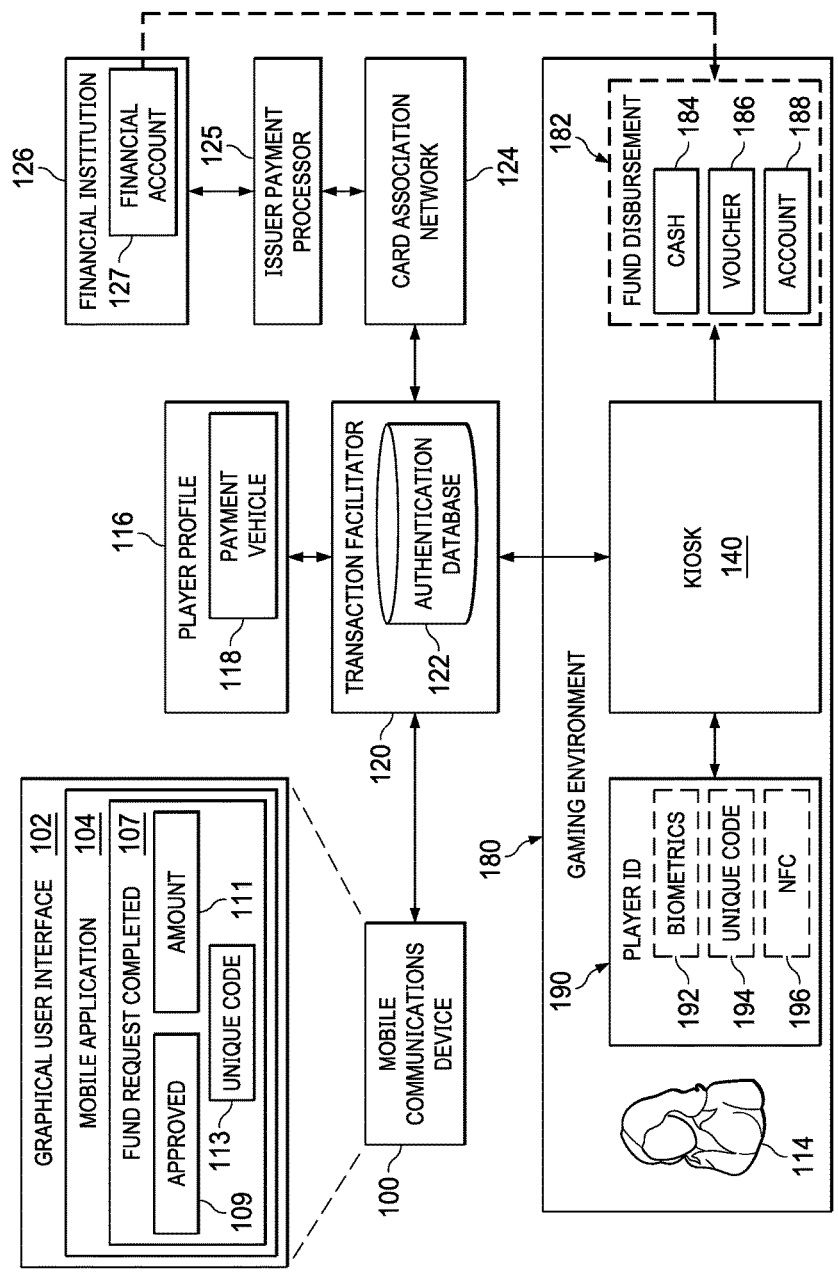
FIG. 3 schematically illustrates a player retrieving disbursed funds from a self-service kiosk within a gaming environment in accordance with one non-limiting embodiment.

FIG. 3 schematically illustrates the player 114 from FIG. 1 retrieving disbursed funds from a self-service kiosk 140 positioned within a gaming environment 180 in accordance with one non-limiting embodiment. The self-service kiosk 140 can be, for instance, a multifunction un-manned kiosk providing various services to players. In some embodiments, the self-service kiosk 140 provides ATM and ticket redemption services, in addition to the services described herein. In other embodiments, the self-service kiosk 140 is a kiosk specialized to provide the cash advance services described herein.

Similar to FIG. 2, subsequent to the authorization request being approved, the mobile application 104 can display an indication of approval 109 and an amount of approved cash advance 111. The player 114 can approach the kiosk 140 and interact with the kiosk 140 to complete the transaction. During the transaction, the player 114 can provide a player identifier 190. The format of the player identifier 190 can vary, but in some embodiments the player identifier 190 can a biometric identifier 192, a unique code 194, or a code or beacon transmitted via near field communication 196. In some embodiments, the player identifier 190 may be provided by the player swiping or scanning their driver's license, payment vehicle 118, and/or a player loyalty card. Further, the unique code 194 can be, without limitation, an optical code (i.e., QR code, bar code), an audio code, an alphanumeric code, a code transmittable via a near field communication protocol, and so forth. In some embodiments, the unique code 194 provided to the kiosk 140 is the unique code 113 generated by the mobile communications device 100.

Once the player identifier 190 is received by the kiosk 140, the kiosk 140 can query the transaction facilitator 120 to determine whether to disburse funds to the player 114. In other embodiments, the kiosk 140 has access to the authorization approval without having to communicate with the transaction facilitator 120 during the transaction. As indicated in FIG. 3, a funds disbursement process 182 at the kiosk 140 can occur in a variety of different ways. For example, the kiosk 140 may dispense cash 184 or a print a voucher 186 (such as a "TITO" ticket). Additionally or alternatively, the funds acquired from the cash advance may be loaded into an account 188 of the player 114, with funds in the account 188 usable for gameplay.

Figure 4:
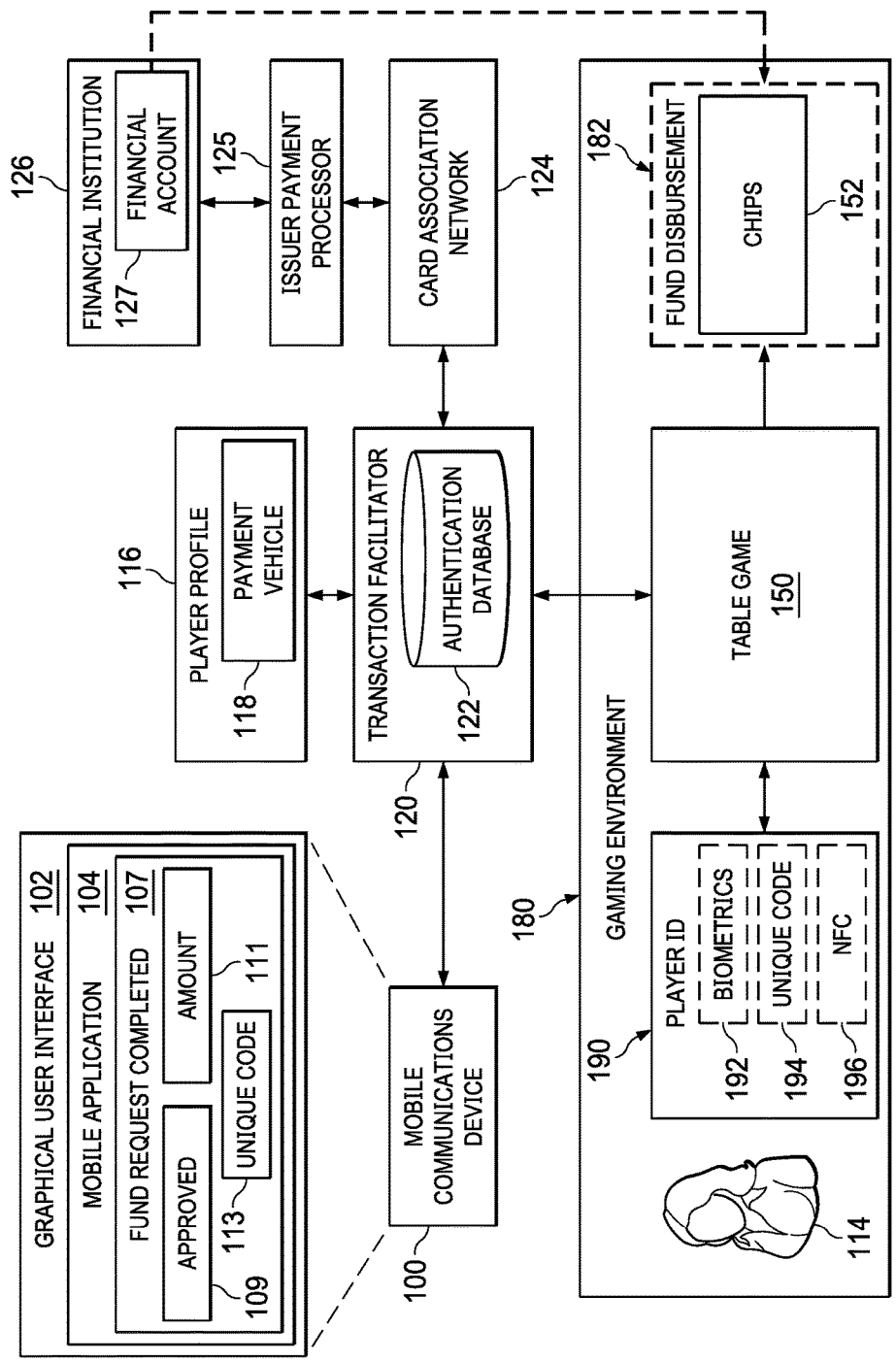
FIG. 4 schematically illustrates a player retrieving disbursed funds from an electronic table game within a gaming environment in accordance with one non-limiting embodiment.

FIG. 4 schematically illustrates the player 114 from FIG. 1 retrieving disbursed funds from a table game 150 positioned within a gaming environment 180 in accordance with one non-limiting embodiment. In some embodiments, the table game 150 is an electronic table game (ETG) that provides automated gameplay without a dealer. Similar to FIG. 2, subsequent to the authorization request being approved, the mobile application 104 can display an indication of approval 109 and an amount of approved cash advance 111. The player 114 can approach the table game 150 and interact with the table game 150 to complete the transaction. During the transaction, the player 114 can provide a player identifier 190. The format of the player identifier 190 can vary, but in some embodiments the player identifier 190 can a biometric identifier 192, a unique code 194, or a code or beacon transmitted via near field communication 196. In some embodiments, the player identifier 190 may be provided by the player swiping or scanning their driver's license, payment vehicle 118, and/or a player loyalty card. Further, the unique code 194 can be, without limitation, an optical code (i.e., QR code, bar code), an audio code, an alphanumeric code, a code transmittable via a near field communication protocol, and so forth. In some embodiments, the unique code 194 provided to the table game 150 is the unique code 113 generated by the mobile communications device 100.

Once the player identifier 190 is received by the table game 150, the table game 150 can cause the transaction facilitator 120 to be queried to determine whether to disburse funds to the player 114. As indicated in FIG. 4, a funds disbursement process 182 at the table game 150 can include dispensing chips 152, such as virtual chips usable for ETG gameplay, to the player. In some embodiments, the table game 150 may dispense funds in other formats, such as a printed voucher.

Figure 5:
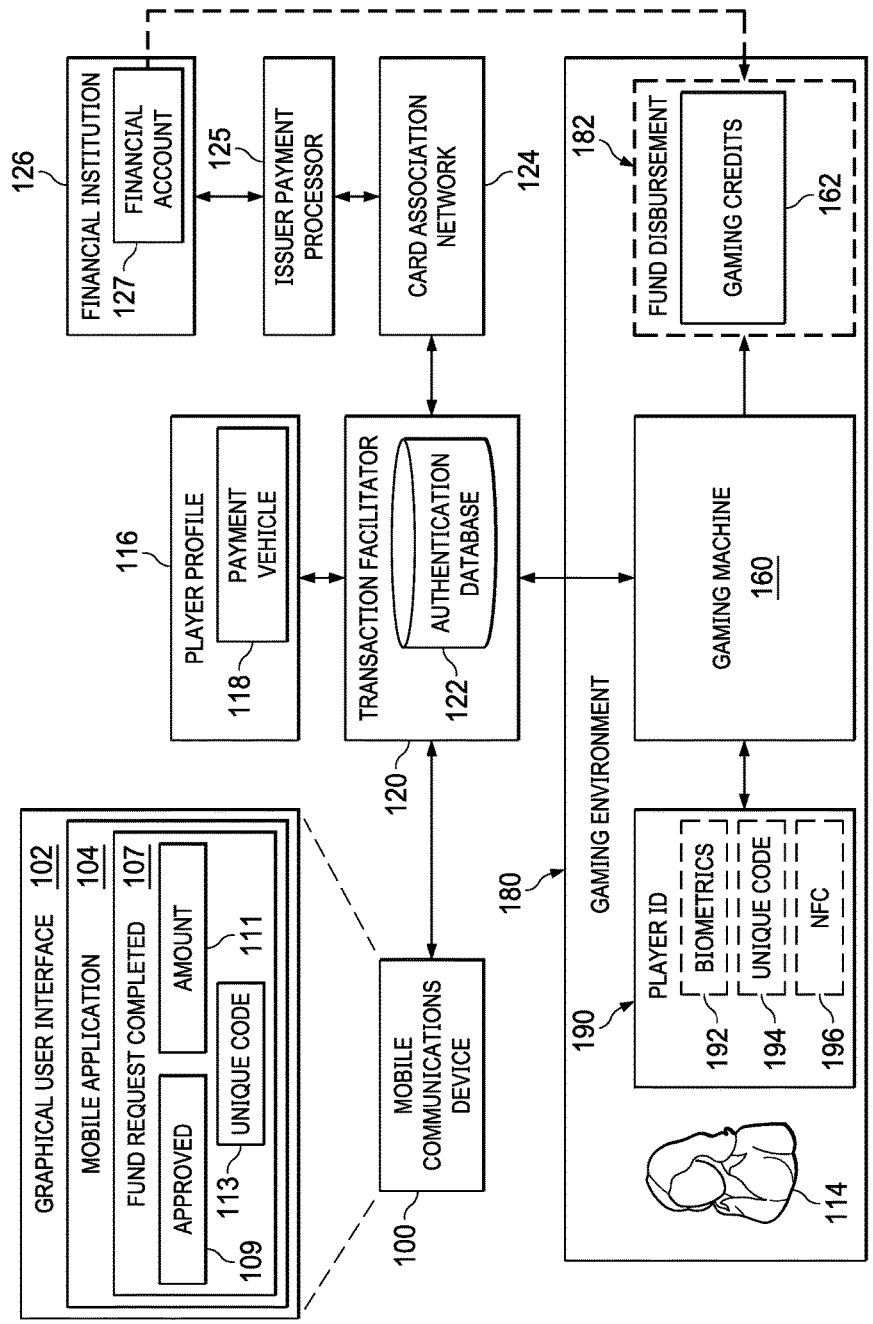
FIG. 5 schematically illustrates a player retrieving disbursed funds from a gaming machine within a gaming environment in accordance with one non-limiting embodiment.

FIG. 5 schematically illustrates the player 114 from FIG. 1 retrieving disbursed funds from a gaming machine 160 positioned within a gaming environment 180 in accordance with one non-limiting embodiment. The gaming machine 160 can be any of a variety of gaming machines prevalent in gaming environments, such a slot machines, video poker machines, video blackjack machines, multi-game machines, and so forth. Similar to FIG. 2, subsequent to the authorization request being approved, the mobile application 104 can display an indication of approval 109 and an amount of approved cash advance 111. The player 114 can approach the gaming machine 160 and interact with the gaming machine 160 to complete the transaction. During the transaction, the player 114 can provide a player identifier 190. The format of the player identifier 190 can vary, but in some embodiments the player identifier 190 can a biometric identifier 192, a unique code 194, or a code or beacon transmitted via near field communication 196. In some embodiments, the player identifier 190 may be provided by the player swiping or scanning their driver's license, payment vehicle 118, and/or a player loyalty card. Further, the unique code 194 can be, without limitation, an optical code (i.e., QR code, bar code), an audio code, an alphanumeric code, a code transmittable via a near field communication protocol, and so forth. In some embodiments, the unique code 194 provided to the gaming machine 160 is the unique code 113 generated by the mobile communications device 100.

Once the player identifier 190 is received by the gaming machine 160, the gaming machine 160 can cause the transaction facilitator 120 to be queried to determine whether to disburse funds to the player 114. As indicated in FIG. 5, a funds disbursement process 182 at the gaming machine 160 can include dispensing gaming credits 162 to the player that are usable for gameplay at the gaming machine 160. In some embodiments, the gaming machine 160 may dispense funds in other formats, such as a voucher.

Figure 6:
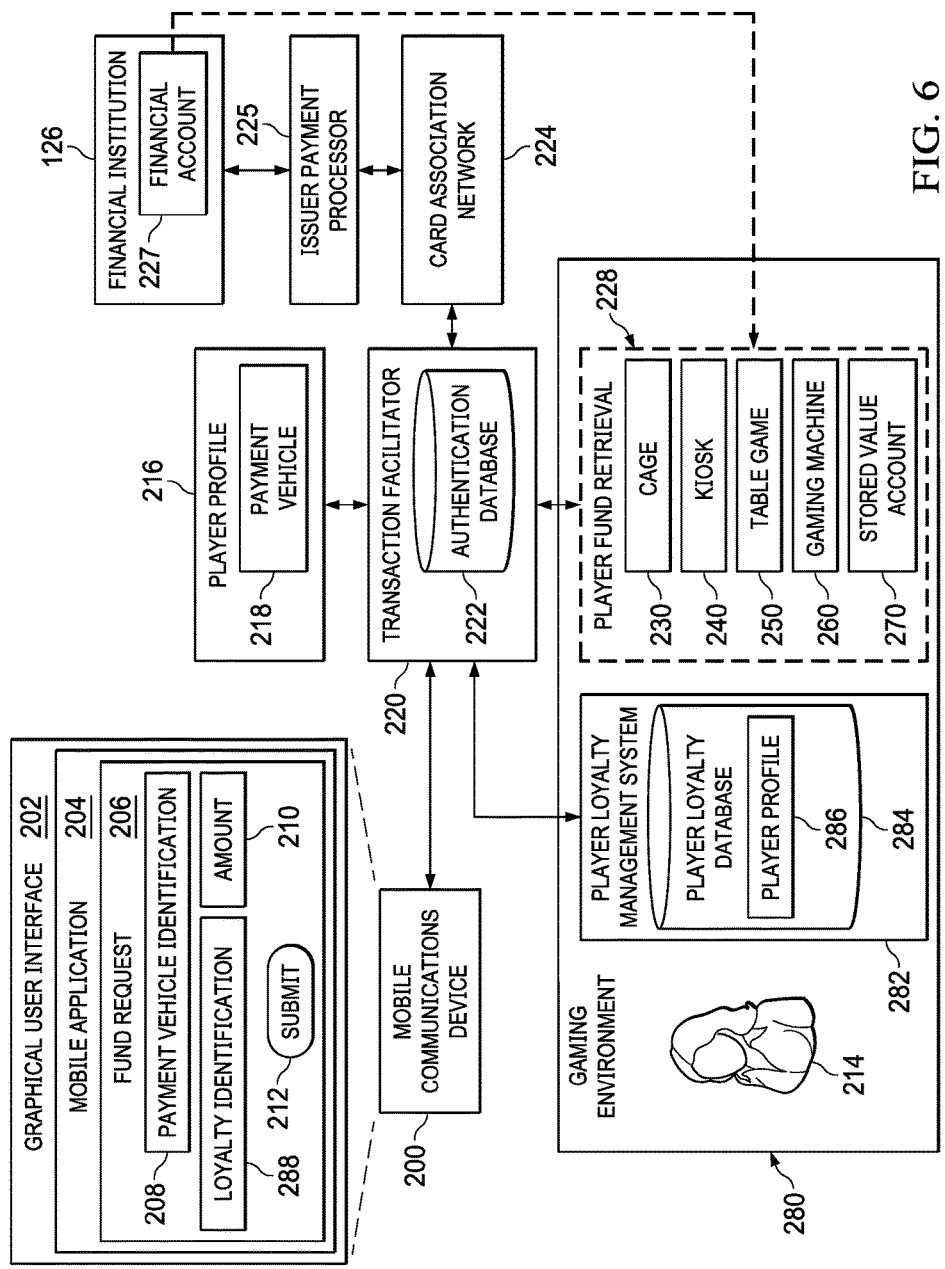
FIG. 6 schematically illustrates a player retrieving funds from a financial account via a fund request provided via a mobile communications device in accordance with another non-limiting embodiment.

FIG. 6 schematically illustrates a player 214 retrieving funds from a financial account 227 via a fund request provided via a mobile communications device 200 in accordance with another non-limiting embodiment. The embodiment depicted in FIG. 6 can be similar to, or the same in many respects as, the embodiment depicted in FIG. 1. For example, the player 214 can interact with the mobile communications device 200 to initiate a fund request 206 via a mobile application 204 that is displayed on a graphical user interface 202. Through the fund request 206, a payment vehicle identifier 208 and an amount of cash advance 210 can be provided to a transaction facilitator 220. The transaction facilitator 220 can coordinate the submission of an authorization request to an issuer payment processor 225 via a card association network 224. The card association network 224 can be associated with the payment vehicle identified by the transaction (i.e. payment vehicle 218). Similar to FIG. 1., the authorization request can cause the issuer payment processor 225 to communicate with the financial institution 226 managing the financial account 227 tied to the payment vehicle 218. A response to the authorization request can be stored in an authorization database 222.

As depicted in FIG. 6, a player loyalty management system 282 associated with the gaming environment 280 can maintain a player loyalty database 284 with a player profile 286 for the player 214. As shown in the funds request screen 206, a loyalty identifier 288 of the player 214 can be included with the cash advance request. The loyalty identifier 288 can be, for instance, a unique loyalty account number assigned to that player 214 for the purposes of gameplay tracking. By including the loyalty identifier 288, the transaction facilitator 220 can assist with tracking and monitoring the number of cash advance attempts submitted by a player 214, as well as the amount of funds requested in each attempt. Prior to allowing the player 214 to retrieve funds during a player fund retrieval process 228, a velocity check can be performed. In some embodiments, the transaction facilitator 220 performs a velocity check to confirm that the player 214 has not exceeded a velocity threshold. The velocity threshold can vary based on implementation, but in some embodiments, the velocity threshold relates to an amount of total funds advanced over a particular period of time. In some embodiments, the velocity threshold relates to an amount of total cash advance transactions requested over a particular period of time. In some embodiments, the velocity threshold relates to a combination of an amount of total cash advance transactions and an amount of total funds advanced over a particular period of time. If the velocity check is satisfied, player funds can be dispensed to the player 214 in any suitable format, such as via the casino cage 230, a kiosk 240, a table game 250, a gaming machine 260, or via stored value account 270.

Figure 7:
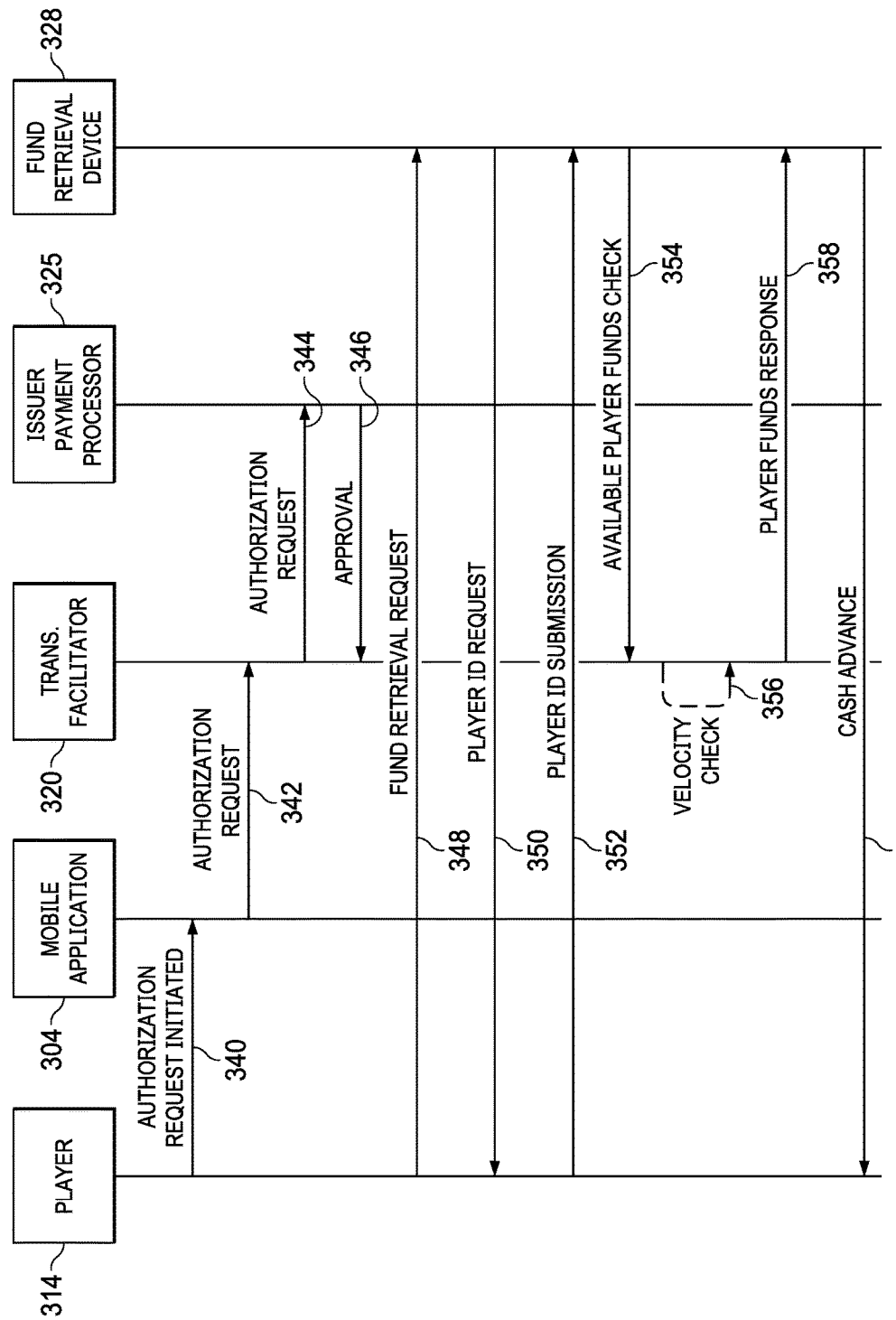
FIG. 7 is a message sequence chart in accordance with one non-limiting embodiment.

FIG. 7 is a message sequence chart in accordance with one non-limiting embodiment. A player 314 can initiate an authorization request 340 through interactions with a mobile application 304. As provided above, the authorization request 340 can identify a payment vehicle and a desired amount of the cash advance. The mobile application 304 can relay the authorization request 342 to a transaction facilitator 320. The transaction facilitator 320 then can pass an authorization request 344 to an issuer payment processor 325 associated with the payment vehicle identified in the authorization request 344. An approval 346 can be returned to the transaction facilitator 320. The player 314 can then approach a fund retrieval device 328 to complete the transaction. The fund retrieval device 328 can be any suitable device, such as a casino cage terminal, a self-service kiosk, an electronic table game, or a gaming machine, for example. The player 314 can interact with the fund retrieval device 328 and supply a fund retrieval request 348. In response, the fund retrieval device 328 can request a player identifier 350. The type of requested player identifier may vary based on type of fund retrieval device 328. Once the player identifier submission 352 is received by the fund retrieval device 328, it can be provided to the transaction facilitator 320 to complete the transaction. An available funds check 354 can be performed to see if an authorization approval for the transaction has been received. In some embodiments, either at this time or at another time during the transaction, a velocity check 356 can be performed to ensure that the transaction satisfies any applicable velocity thresholds. Assuming the velocity check is satisfied, a player funds response 358 can be provided to the fund retrieval device 328 providing fund disbursement instructions. A cash advance 360 can then be provided to the player 314.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations. It can be appreciated that the examples are intended primarily for purposes of illustration of the invention for those skilled in the art. No particular aspect or aspects of the examples are necessarily intended to limit the scope of the present disclosure. For example, no particular aspect or aspects of the examples of system architectures, table layouts, or report formats described herein are necessarily intended to limit the scope of the disclosure.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

While various embodiments have been described herein, it should be apparent, however, that various modifications, alterations and adaptations to those embodiments may occur to persons skilled in the art with the attainment of some or all of the advantages of the present disclosure. The disclosed embodiments are therefore intended to include all such modifications, alterations and adaptations without departing from the scope and spirit of the present disclosure as set forth in the appended claims.

What is claimed is:

1. A computer-based method of conducting player funds retrieval, the method comprising:
   receiving a player funding instruction to retrieve funds from a financial account associated with a payment vehicle issued to the player, wherein the player funding instruction is entered into a mobile computing device and identifies an amount of funds to be retrieved from the financial account, wherein the payment vehicle is associated with a card association network;
   electronically communicating an authorization request through the card association network to an issuer payment processor of the payment vehicle;
   receiving from the issuer payment processor through the card association network an authorization approval;
   storing an indication of the authorization approval in a data store, wherein the authorization approval is tied to the player in the data store;
   subsequent to the receiving of the authorization approval, receiving from a fund retrieval device a fund retrieval request, wherein the fund retrieval request comprises a player identifier of the player;
   querying the data store to determine that the fund retrieval request is authorized based on the stored indication of the authorization approval; and
   causing funds to be provided to the player at the fund retrieval device.

2. The method of claim 1, wherein the fund retrieval device is any of a casino cage terminal, a self-service kiosk, an electronic table game, and a gaming machine.

3. The method of claim 2, wherein the fund retrieval device is physically within a gaming environment.

4. The method of claim 3, further comprising:
   prior to electronically communicating the authorization request to the issuer payment processor of the payment vehicle, determining that the mobile computing device is physically within the gaming environment.

5. The method of claim 1, wherein causing funds to be provided to the player at the fund retrieval device comprises providing the player with currency.

6. The method of claim 1, wherein causing funds to be provided to the player at the fund retrieval device comprises providing the player with a voucher representative of funds.

7. The method of claim 1, wherein causing funds to be provided to the player at the fund retrieval device comprises providing the player with chips.

8. The method of claim 1, wherein causing funds to be provided to the player at the fund retrieval device comprises providing the player with gameplay credits.

9. The method of claim 1, wherein causing funds to be provided to the player at the fund retrieval device comprises increasing a balance of a stored value account accessible by the player for wagering.

10. The method of claim 1, further comprising:
subsequent to the receiving of the authorization approval, causing a unique code to be displayed on a user interface of remote computing device.

11. The method of claim 10, wherein the player identifier comprises the unique code.

12. The method of claim 10, wherein the unique code is an optical code.

13. The method of claim 10, further comprising:
prior to causing funds to be provided to the player at the fund retrieval device, determining that a velocity check is satisfied and only allowing funds to be provided to the player at the fund retrieval device when the velocity check is satisfied.

14. A computer-based method of conducting player funds retrieval, the method comprising:
receiving a player funding instruction to retrieve funds from a financial account associated with a payment vehicle issued to the player, wherein the player funding instruction is entered into a mobile computing device and identifies an amount of funds to be retrieved from the financial account, wherein the payment vehicle is associated with a card association network;
electronically communicating an authorization request through the card association network to an issuer payment processor of the payment vehicle;
receiving from the issuer payment processor through the card association network an authorization approval;
storing an indication of the authorization approval in a data store, wherein the authorization approval is tied to the player in the data store;
subsequent to the receiving of the authorization approval, receiving from a self-service kiosk within a gaming environment a fund retrieval request, wherein the fund retrieval request comprises a player identifier of the player entered into the self-service kiosk by the player;
querying the data store to determine that the fund retrieval request is authorized based on the stored indication of the authorization approval; and
causing funds to be provided to the player at the self-service kiosk.

15. The method of claim 14, wherein causing funds to be provided to the player at the self-service kiosk comprises printing a voucher representative of funds.

16. The method of claim 14, wherein causing funds to be provided to the player at the self-service kiosk comprises dispensing cash from the self-service kiosk.

17. The method of claim 14, wherein causing funds to be provided to the player at the self-service kiosk comprises increasing a balance of a stored value account accessible by the player for wagering.

18. The method of claim 14, further comprising:
prior to causing funds to be provided to the player at the self-service kiosk, determining that a velocity check is satisfied and only allowing funds to be provided to the player at the self-service kiosk when the velocity check is satisfied.

19. The method of claim 14, wherein the self-service kiosk provides ATM functionality and ticket redemption functionality.

20. The method of claim 14, further comprising:
subsequent to the receiving of the authorization approval, causing a unique code to be displayed on a user interface of remote computing device, wherein the player identifier received at the self-service kiosk comprises the unique code.

21. The method of claim 20, wherein the unique code is an optical code readable by the self-service kiosk.

22. A computer-based method of conducting player funds retrieval, the method comprising:
receiving a player funding instruction to retrieve funds from a financial account associated with a payment vehicle issued to the player, wherein the player funding instruction is entered into a mobile computing device and identifies an amount of funds to be retrieved from the financial account, wherein the payment vehicle is associated with a card association network;
electronically communicating an authorization request through the card association network to an issuer payment processor of the payment vehicle;
receiving from the issuer payment processor through the card association network an authorization approval;
storing an indication of the authorization approval in a data store, wherein the authorization approval is tied to the player in the data store;
subsequent to the receiving of the authorization approval, receiving from a fund retrieval device a fund retrieval request, wherein the fund retrieval request comprises a player identifier of the player;
querying the data store to determine that the fund retrieval request is authorized based on the stored indication of the authorization approval;
performing a velocity check based on previous transactions initiated by the player; and
causing funds to be provided to the player at the fund retrieval device when the velocity check is satisfied.

23. The method of claim 22, wherein the player is associated with a player profile maintained by a player loyalty management system.

24. The method of claim 23, wherein performing the velocity check comprises querying the player profile maintained by the player loyalty management system to determine a transaction history for the player.

25. The method of claim 22, wherein the fund retrieval device is any of a casino cage terminal, a self-service kiosk, an electronic table game, and a gaming machine.

26. The method of claim 22, wherein the funds provided to the player are any of currency, a voucher representative of funds, chips, and gameplay credits.

* * * * *